United States Patent [19]

Miyama et al.

[11] 3,858,079

[45] Dec. 31, 1974

[54] COLOR CAMERA TUBE HAVING A COLOR STRIP FILTER

[75] Inventors: Hiroshi Miyama; Kaoru Tomii, both of Kawasaki, Japan

[73] Assignee: Matsushita Electric Industrial Company, Limited, Osaka, Japan

[22] Filed: Dec. 26, 1972

[21] Appl. No.: 318,478

[30] Foreign Application Priority Data

Dec. 27, 1971 Japan .............................. 46-47625

[52] U.S. Cl. ................. 313/372, 178/7.85, 313/384

[51] Int. Cl. ........................................... H01j 31/26

[58] Field of Search .......... 313/65 R, 65 LF, 92 LF, 313/372; 178/7.85, 7.86

[56] References Cited

UNITED STATES PATENTS 3,124,715 3/1964 Cox ................................ 315/65 LF

*Primary Examiner*—Alfred E. Smith

*Assistant Examiner*—Lawrence J. Dahl

[57] ABSTRACT

A color camera tube is provided, which comprises an improved target assembly including a color strip filter mounted on the inner surface of the transparent face-plate, a thin fibre optics plate adhered to the color strip filter, a transparent electro-conductive thin film disposed on the fibre optics plate, and a photoconductive layer mounted on the thin film.

1 Claim, 8 Drawing Figures

COLOR CAMERA TUBE HAVING A COLOR STRIP FILTER

The present invention relates to camera tubes and more particularly to a color camera tube which includes a color strip filter.

It is a primary object of the present invention to provide an improved color camera tube which can be readily fabricated.

It is another object of the present invention to provide an improved color camera tube which can correctly pick up a color image with a high resolution power.

These and other objects of the present invention will now become apparent from the following detailed description when taken in connection with the accompanying drawings in which.

Like parts are designated by like reference numerals in the views.

Figure 1:
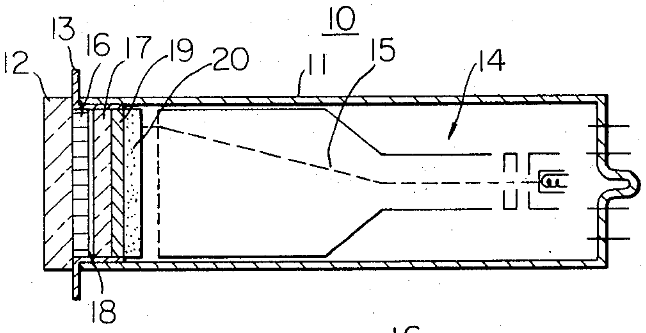
FIG. 1 is a longitudinal sectional view of a conventional color camera tube having a color strip filter.

Referring now to the drawings and more specifically to FIG. 1 thereof, it will be seen a conventional color camera tube 10 which includes an evacuated envelope 11 having a cylindrical portion with an open end and a transparent faceplate 12 hermetically fastened onto the open end of the cylindrical portion through an indium seal ring 13. An electron gun assembly 14 is so positioned within the envelope 11 that the electron gun assembly 14 emits an electron beam 15 toward the faceplate 12. A color strip filter 16 is mounted on the inner surface of the faceplate 12 facing the electron gun assembly 14. The color strip filter 16 is made of an organic compound and having thereon a plurality of color strip patterns. A thin glass plate 17 is fastened on the color strip filter 16 by means of adhesive agent 18 so as to cover the color strip filter 16. On the glass plate 17 is mounted a transparent electrically conductive thin film 19 made of, for example, $SnO_2$ or $InO_2$ and electrically connected with the indium seal ring 13. With the conductive thin film 19 is electrically contacted a photoconductive layer 20 which is thus impinged by the electron beam 15 emitted from the electron gun assembly 14.

The above-mentioned color camera tube 10 is fabricated through first forming a target assembly. The target assembly is made through the steps of fastening the color strip filter 16 on the faceplate 12, adhering the thin glass plate 17 on the color strip filter by means of the adhesive agent 18, mounting the conductive thin film 19 on the thin glass plate 17 and coating the photoconductive layer 20 on the conductive thin film 19. The thus formed target assembly is fastened to the open end of the cylindrical portion by means of the indium seal ring 13 so as to form the evacuated envelope 11.

Figure 2:
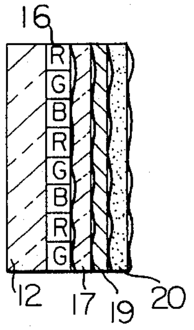
FIG. 2 is a fragmentary sectional view of the target assembly of the color camera tube of FIG. 1.

It is, in this instance, to be noted that the thin glass plate 17 prevents such gases that will degrade the degree of vacuum in the envelope 11 from emanating from the color strip filter 16. So as to permit an optical image to be transmitted through the glass plate 17 without distortion, the glass plate 17 is made as uniform and thin as possible, namely, has a uniform thickness of, for example, 30λ. It is, however, difficult to make such thin glass plate of uniform thickness. Further, the thin glass plate 17 is subject to crack due to shocks and vibrations applied thereto. Furthermore, since the glass plate 17 is adhered to the color strip filter 16 by means of the adhesive agent 18, the glass plate 17 is subject to bend as shown in FIG. 2. Accordingly, the conductive thin film 19 and photoconductive layer 20 are also bent as shown in FIG. 2, thereby causing unwanted distortion of the picked up image.

Figure 3:
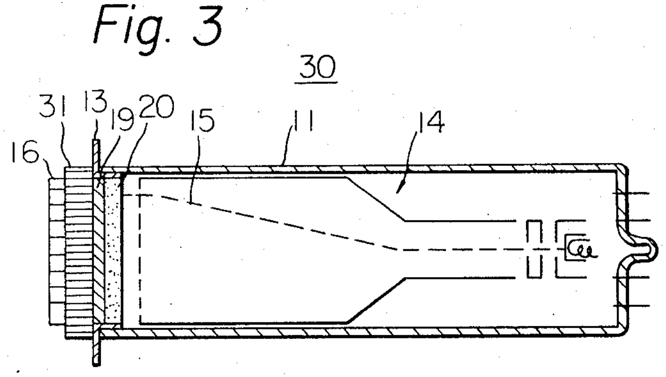
FIG. 3 is a longitudinal sectional view of another conventional color camera tube including a color strip filter mounted on the outer surface of a fibre optics faceplate.

In FIG. 3, there is shown another conventional color camera tube 30 which includes an evacuated envelope 11 having a cylindrical portion with an open end and a fibre optics faceplate 31 hermetically fastened to the open end of the cylindrical portion by means of an indium seal ring 13. An electron gun assembly 14 is so positioned within the envelope 11 that the electron gun assembly 14 emits an electron beam 15 toward the faceplate 31. A color strip filter 16 is mounted on the outer surface of the fibre optics faceplate 31. On the inner surface of the faceplate 31 is mounted an electroconductive thin film 19 which is electrically connected with the seal ring 13. With the conductive thin film 19 is electrically contacted a photoconductive layer 20 which is to be impinged by the electron beam 15 emitted from the electron gun assembly 14.

This color camera tube 30 is advantageous in that gases emanated from the color strip filter 16 does not enter the evacuated envelope 11 and that the fibre optics faceplate 31 is not subject to such cracking as occurring in the thin glass plate of the color camera tube 10 above-described in conjunction with FIGS. 1 and 2.

Figure 4A:
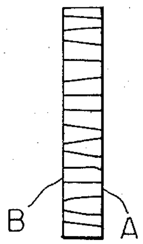
FIGS. 4A, 4B and 4C are explanatory views for explaining distortion of an image passed through the fibre optics faceplate of the color camera tube of FIG. 3.
Figure 4B:
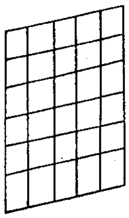
Figure 4C:
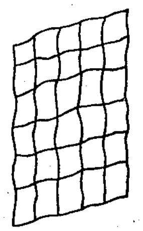

It is, however, a problem in this camera tube 30 that the fibre optics faceplate 31 leaks because of its nature thereby causing the degree of vacuum of the envelope 11 to degrade. Furthermore, since the fibre optics faceplate 31 should have such a large thickness as about 4 millimeters in order to withstand the air pressure, a problem is encountered in the non-uniformity of alignment of the optical fibres constituting the fibre optics faceplate 31 as illustrated in FIG. 4A. When, therefore, a pattern as shown in FIG. 4B is transmitted from one surface A to the other surface B, the transmitted pattern is distorted as shown in FIG. 4C. It is to be understood that the distortion is enlarged when the distorted pattern is reproduced on a faceplate of a usual display tube. In addition, such thick fibre optics faceplate is quite costly.

Figure 5A:
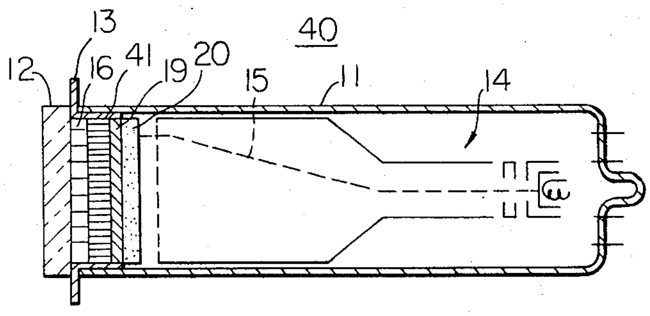
FIG. 5A is a longitudinal sectional view of a color camera tube according to the present invention.
Figure 5B:
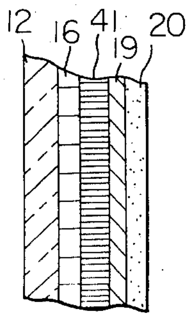
FIG. 5B is a fragmentary view of the target assembly the color camera tube of FIG. 5A.

In order to solve such problems encountered in the conventional color camera tubes as above-described, an improved color camera tube is provided according to the present invention. A color camera tube according to the invention is illustrated in FIGS. 5A and 5B, which generally designated by a reference numeral 40 and comprises an evacuated envelope 11 having a cylindrical portion with an open end and a transparent faceplate 12 hermetically fastened to the open end of the cylindrical portion by means of seal ring 13 made of, for example, indium. An electron gun assembly 14 is so placed within the envelope 11 that an electron beam 15 emitted from the electron gun assembly 14 is directed to the faceplate 12. A color strip filter 16 is mounted on the inner surface of the faceplate 12. A thin fibre optics plate 41 is adhered onto the color strip filter 16 by means of a transparent adhesive agent. The fibre optics plate 41 is coated with a transparent electro-conductive thin film 19 which is electrically connected with the seal ring 13. A photoconductive layer 20 is evaporated on the thin film 19, so that the photoconductive layer 20 is scanned by the electron beam 15 when the electron beam 15 is deflected by a deflection element (not shonw) provided around the cylindrical portion of the envelope 11.

It is now to be appreciated that since the thin fibre optics plate 41 is not subjected to the air pressure, the fibre optics plate 41 can be made so thin as about 0.5 to 1 millimeter, so that the fibre optics plate 41 does not distort an optical image passing therethrough even if there is non-uniformity in the alignment of the optical fibres of the fibre optics plate 41. Further, since the fibre optics 41 is so thin, the fibre optics plate 41 is extremely economical. Furthermore, the fibre optics plate 41 completely prevents organic gases from emanating from the color strip filter 16. Since, in addition, the color camera tube of the invention does not include such thin glass plate as the camera tube of FIG. 1, the color camera tube of the invention can be fabricated without such problem as encountered in the camera tube of FIG. 1.

What is claimed is:

1. A color camera tube, which comprises:

an evacuated envelope having a transparent faceplate sealed thereto and closing an end thereof;

an electron gun assembly placed within said envelope toward another end thereof, for emitting an electron beam toward said faceplate;

a color strip filter mounted within said evacuated envelope on the inner surface of said transparent faceplate facing said electron gun assembly;

a thin fibre optics plate mounted on said color strip filter within said evacuated envelope and facing said electron gun assembly;

a transparent electrically conductive thin film mounted on said optics plate and electrically led to the outside of said envelope; and a photoconductive layer mounted on said conductive thin film.

* * * * *